United States Patent Office 3,447,625
Patented June 3, 1969

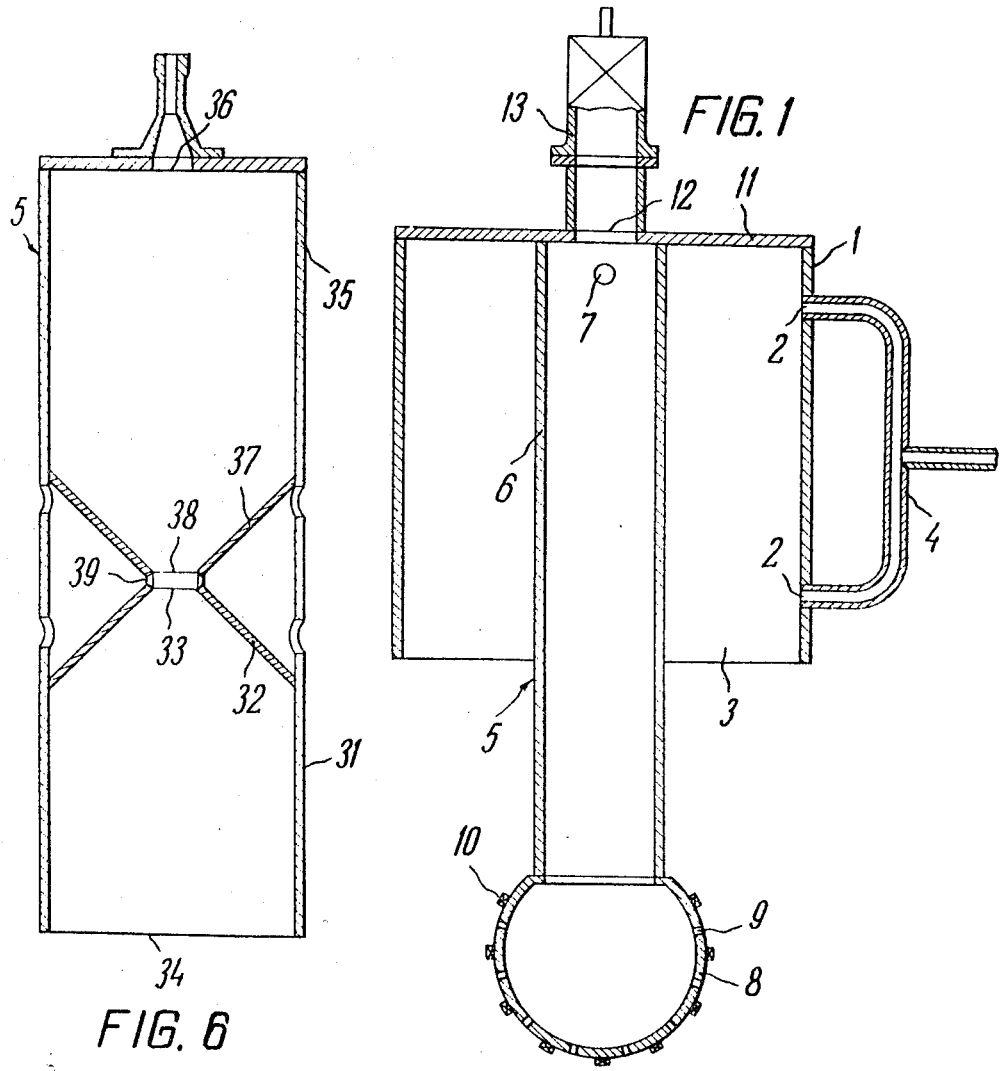

3,447,625
DEVICE FOR SEISMIC PROSPECTING
Mikhail Ivanovich Balashkand, Akademicheskaya ulitsa, 98, kv. 13, Monino Moskovskio Oblasti; Georgy Stepanovich Evdokimov, Novoselskoe shosse, 35-a, kv. 48, Ramenskoe Moskovski Oblasti; Berta Lvovna Kaplan, Vorontsovskaya ulitsa, 24/6, kv. 12; and Sergei Alexandrovich Lovlya, ulitsa Sretenka, 24, kv. 24; and Viktor Vasilievich Maiorov, Zveingorodskoe shosse, 3-a, kv. 197; and Leonid Nikolaevich Solodilov, Studencheskaya ulitsa, 32, kv. 145, Moscow; and Alexandr Ivanovich Teterin, ulitsa 2 Chkalovskaya, 29, kv. 6, Ramenskoe Moskovskoi Oblasti; and Oleg Lanfanovich Chen, 1 Sadovaya ulitsa, 2, Vostrayakovo Moskovskoi Oblasti, all of U.S.S.R.
Filed Mar. 1, 1967, Ser. No. 619,726
Int. Cl. G01v 1/00
U.S. Cl. 181—.5     3 Claims

ABSTRACT OF THE DISCLOSURE

A device for sea seismic prospecting in which elastic waves are generated via an explosion of a gaseous explosive mixture. The device includes two chambers adapted to be sunk to a depth for exploding the mixture supplied thereto for producing a primary pressure pulse, with the first chamber having an outlet for releasing hot explosion gases. A secondary pressure pulse is generated upon the pulsation of the gas bubble formed by such gases. A coaxial second chamber communicating with the first chamber is provided for exploding the mixture supplied thereto for furnishing the supply into a gas bubble of a medium changing the magnitude of the secondary pulse to weaken one of the pulses.

The present invention relates to devices for generating elastic waves and more particularly for generating elastic waves in water in the course of sea seismic prospecting.

Known in the art are devices for seismic prospecting which generate elastic waves with the aid of explosions of a gaseous explosive mixture in water. In these devices the gaseous explosive mixture is supplied into a chamber provided with an outlet hole, which is sunk to a desired depth. An explosion in water of the gaseous explosive mixture which takes place in this chamber generates a primary seismic impulse as well as a secondary impulse developing during the pulsation of a gaseous bubble formed by the explosion products of the mixture.

A disadvantage of these devices is that in recording the generated seismic impulses, the primary seismic impulse is taken as the basic impulse, in which are predominant high frequency components reducing the efficiency of said devices. Still another disadvantage of these devices is that the overcoming of the secondary seismic impulse which are essentially noise waves requires a special recording technique.

An object of the present invention is to provide a device for seismic prospecting allowing the utilization of, in recording the seismic impulses generated by the aid of the device, a secondary seismic impulse as the basic impulse in which are predominant lower frequency components enabling the improvement of the efficiency of the device.

Another object of the invention is to provide a device for seismic prospecting allowing the utilization of the primary seismic impulse as the basic impulse under the suppression of the secondary seismic impulse near the source generating elastic waves with the result that no special recording technique is required to eliminate the secondary seismic impulse which is a noise wave.

In conformity with the above and other objects, the proposed device for seismic prospecting generating elastic waves by the aid of an explosion in water of a gaseous explosive mixture is provided with means for supplying the working medium into a gaseous bubble which changes the magnitude of the secondary seismic impulse with respect to that of the primary seismic one in order to weaken one of said impulses which is a noise wave.

Other objects and advantages of the invention will become more fully apparent from a consideration of the following description of several embodiments thereof, taken in conjunction with the accompanying drawings, in which:

FIG. 1 is a view in longitudinal section of one embodiment of the invention in which the gaseous bubble is supplied with water taken as the working medium;

FIG. 6 is a view in longitudinal section of a fifth embodiment.

Figure 4:
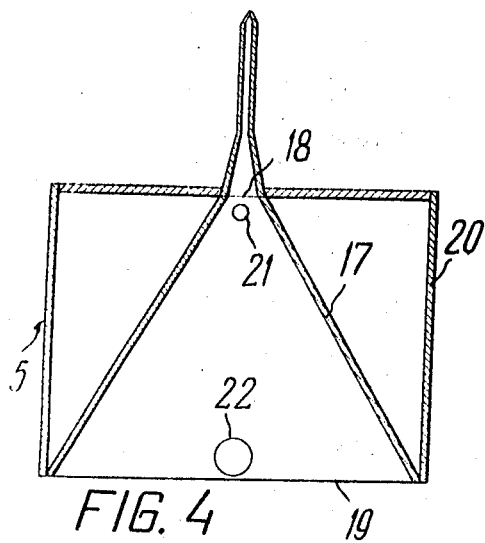
FIG. 4 is a view in longitudinal section of a third embodiment of the invention in which the gaseous bubble is supplied with explosion products of the gaseous explosive mixture taken as the working medium.

The first embodiment of the device comprises a main chamber 1 (FIG. 1) for exploding a gaseous explosive mixture and the chamber is provided with two inlet holes 2 and an outlet hole 3. The inlet holes 2 are connected through a pipeline 4 to a source (not shown in the drawing) supplying a gaseous explosive mixture.

The main chamber 1 is provided with a means 5 for supplying the working medium into a gaseous bubble which changes the magnitude of the primary seismic impulse to weaken one of the impulses being essentially a noise wave. The means 5 is defined by an additional chamber 6 mounted inside the main chamber 1 coaxially therewith and designed for exploding the gaseous explosive mixture. The length of the chamber 6 is somewhat greater than the length of the main chamber 1.

The chamber 6 in its top part is provided with inlet holes 7 for admitting the gaseous explosive mixture thereinto from the chamber 1. Bottom part 8 of the chamber 6 is spherical and provided with perforations 9 and sprayers 10.

The chambers 1 and 6 have a common top cover 11 which is provided with a hole 12 through which the chambers 1 and 6 communicate with an electromagnetic valve 13 for allowing the remains of gases to escape from the chambers 1 and 6 into the surrounding atmosphere.

Figure 2:
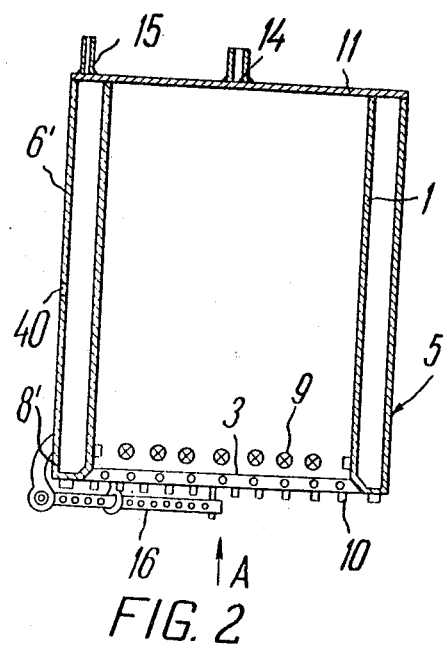
FIG. 2 is a view in longitudinal section of a second embodiment.

In the device according to the second embodiment illustrated in FIG. 2, the means 5 is constituted by an additional chamber 6' mounted outside of and coaxial with the chamber 1. The chambers 1 and 6' have a common top cover 11 in which there are provided inlet holes 14 and 15 for the separate feeding of the gaseous explosive mixture into these chambers from a supply source (not shown in the drawing). Bottom part 8' of the additional chamber 6' is provided with perforations 9 and sprayers 10.

Figure 3:
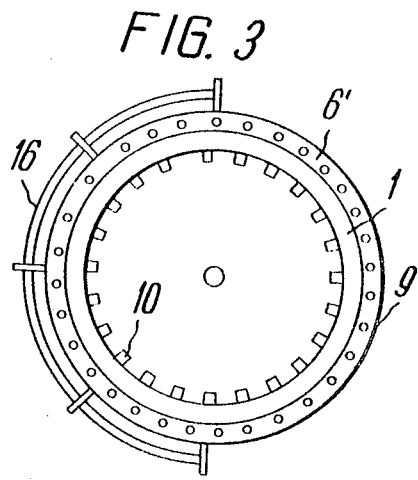
FIG. 3 is a view looking in the direction of the arrow A in FIG. 2.

In addition, adjacent the outlet hole 3 of the main chamber 1 there is provided a perforated circular pipe 16 (FIG. 3) for feeding compressed air which reduces the magnitude of the primary seismic impulse. However, use may be made of any gas instead of the compressed air.

In the embodiments disclosed in FIGS. 1 and 2 water is used as the medium introduced into the gaseous bubble and which serves for increasing the secondary seismic impulse to a magnitude considerably exceeding that of the primary seismic impulse. However, any liquid may be used as the working medium.

In the embodiment of the device shown in FIG. 4, there is provided a main chamber 17 which is conical and has an inlet hole 18 for feeding an explosive gaseous mixture from a supply source (not shown in the drawing) and an outlet hole 19.

The main chamber 17 is provided with an attachment 5 for feeding a medium into a gaseous bubble, which changes the magnitude of the second seismic impulse with respect to the magnitude of the primary seismic impulse.

Means 5 is defined by an additional chamber 20 of cylindrical shape and it will be noted that the base of the latter coincides with the bottom base of the additional chamber 20. The chamber 20 communicates with the chamber 17 through an inlet hole 21 and an outlet hole 22.

Figure 5:
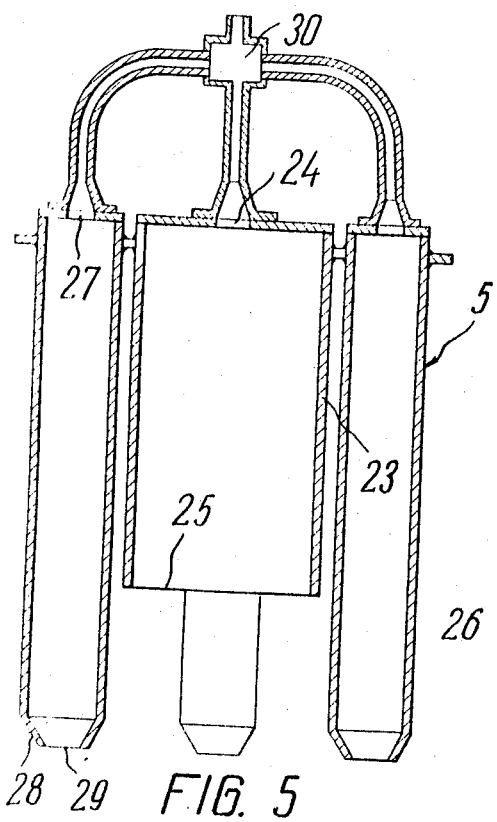
FIG. 5 is a new in longitudinal section of a fourth embodiment.

In the embodiment illustrated in FIG. 5, the device comprises a main cylindrical chamber 23 provided with an inlet hole 24 and an outlet hole 25. The attachment 5 is defined by additional cylindrical chambers 26 disposed outside the chamber 23. Each of the additional chambers 26 is somewhat longer than the main chamber 23. In the top part of each of the additional chamber 26 there is provided an inlet hole 27, and the bottom part thereof terminates in a truncated cone 28 with an outlet hole 29.

The main chamber 23 communicates with the additional chamber 26 and has therewith a common unit 30 for distributing the gaseous explosive mixture from the supply source (not shown in the drawing).

The embodiment of the device disclosed in FIG. 6 comprises a main cylindrical chamber 31 having its top part in the form of a truncated cone 32. The main chamber 31 is provided with an inlet hole 33 and an outlet hole 34.

The means 5 in this embodiment is an additional cylindrical chamber 35 which is an extension of the chamber 31. The chamber 35 has an inlet hole 36 for feeding the gaseous explosive mixture from a supply source (not shown in the drawing) and a truncated cone 37 with an outlet hole 38 in its bottom part.

The shape of the additional chamber 20, 26 and 35 in FIGS. 4, 5 and 6 ensures a delay in discharging the products of explosion of the gaseous explosive mixture therefrom with respect to that from the main chambers 17, 23 and 31, with the products of the explosion being additionally fed with a delay into the gaseous bubble being utilized as a medium to reduce the magnitude of the second seismic impulse which is essentially a noise wave.

In FIG. 6 between the outlet hole 38 and the inlet hole 33 for the additional delay in discharging the products of the explosion from the chamber 35 relative to discharging thereof from the chamber 31 there is provided a nozzle 39.

The principle of operation of the embodiment of the device shown in FIG. 1 is as follows:

The device is suspended on a float, sunk to a required depth and thereafter towed behind a boat. Through a hose (not shown in the drawing) and the inlet hole 2, the gaseous explosive mixture is fed from the supply source to the main chamber 1 until such chamber is completely filled. The mixture also enters into the additional chamber 6, thereby filling the chamber to the level of the outlet hole 3 of the chamber 1. The part 8 of the additional chamber which is disposed beneath this level remains filled with water.

Further, a detonation of the explosive mixture is effected in the hose which through the inlet holes 2 extends to the main chamber 1 and the explosion of the gaseous explosive mixture in the chamber creates an impact wave exciting the primary seismic impulse. The products of explosion of the gaseous explosive mixture escape through the outlet hole 3 into the surrounding water, thereby forming a gaseous bubble.

At the same time, the gaseous explosive mixture in the additional chamber 6 is ignited through the holes 7. Affected by the explosion of the gaseous explosive mixture in the chamber 6 water is sprayed through the sprayer 10 into the expanding gaseous bubble.

The injection of the water drops causes a considerable cooling of the explosion products of the gaseous explosive mixture in the bubble and creates additional centers of condensation. This gives rise to the intensive condensation of the water vapors presenting a larger part of the explosion products. Besides, in the water drops the dissolution of carbon dioxide occurs.

As a result of a substantial reduction in the amount of gases within a notably expanded bubble and their temperature, the pressure inside the gaseous bubble drastically falls, thereby getting far less than the hydrostatic pressure, which leads to the growth of the secondary seismic impulse forming during the bursting of the gaseous bubble to a magnitude essentially exceeding the magnitude of the primary seismic impulse. The remains of gases are discharged from the chambers 1 and 6 through the electromagnetic valve 13 after which the operation cycle may be repeated.

In the process of filling the chamber 1 with the gaseous explosive mixture, it is possible to fill it with such an amount of the mixture which provides for a water seal at the outlet hole 3. The water seal weakens the impact wave causing the primary seismic impulse which is essentially a noise wave.

The operation of the device of FIG. 2 is similar to that of FIG. 1.

The difference is that the feed of the gaseous explosive mixture from the supply source to the main chamber 1 and the additional chamber 6' is effected separately. The main chamber 1 is filled up to the level of the outlet hole 3 and the chamber 6' to the level of the hole 40 and the excess of the gaseous explosive mixture is discharged through the hole into the surrounding water.

A number of seconds prior to the explosion, the air under pressure is fed into the pipe 16 through a hose (not shown in the drawing) and forms a bubble screen beneath the outlet hole 3. An impact wave which is formed during the explosion of the gaseous explosive mixture and which causes the primary seismic impulse is absorbed to a great extent by the bubble screen.

The operation of the device illustrated in FIG. 4 is as follows:

The device is suspended on a float, sunk to a required depth and toward behind a boat. The gaseous explosive mixture from the supply source is fed through a hose into the main chamber 17 until the chamber is completely filled. In addition, the gaseous explosive mixture also enters the additional chamber 20 via the hole 21 and drives water therefrom through the holes 22.

When the chambers 17 and 20 have been fully filled, the detonation of the gaseous explosive mixture is caused in the main chamber 17. An impact wave which develops after the explosion in the main chamber 17 produces the primary seismic impulse. The explosion products of the gaseous explosive mixture which pass through the outlet hole 19 form a gaseous bubble. The ignition of the mixture in the chamber 20 is effected through the holes 21 and 22.

As the explosion products leave the main chamber 17, the pressure drop in the chambers 17 and 20 increases, thus leading to the intensive propagation of the explosion products of the mixture from the additional chamber through the holes 21, 22 and 19 into the gaseous bubble at the moment of its maximum expansion. As a result, the pressure in the gaseous bubble increases to a magnitude close to the hydrostatic pressure, which prevents the sharp bursting of the gaseous bubble and reduces the magnitude of the secondary seismic impulse which is essentially a noise wave.

The device is now ready for a new operating cycle.

The operation of the device disclosed in FIG. 5 is similar to that of FIG. 4 and the difference is that the chambers 23 and 26 are simultaneously filled with the gaseous explosive mixture through the distributing unit 30.

The chamber 23 is filled with the gaseous explosive mixture to the full volume thereof, and the additional chambers 26 to the level of the outlet hole 25. The bottom part of the chambers 26 remain filled with water. Then a detonation of the gaseous explosive mixture is effected which extends into the chambers 23 and 26 via unit 30.

The weakening of the secondary seismic impulse takes place in the same manner as was the case during the operation of the device disclosed in FIG. 4.

The operation of the device of FIG. 6 is similar to that shown in FIGS. 4 and 5. The difference consists in that the gaseous explosive mixture is first supplied into the additional chamber 35 through the inlet hole 36 and through the nozzle 39 into the main chamber 31 until they are completely filled.

The weakening of the secondary seismic impulse takes place also in the same manner as described in connection with FIGS. 4 and 5.

When describing the above embodiments of the invention, a certain narrow terminology is resorted to for the sake of clarity. However, the invention is not limited with the terms so selected, and it should be borne in mind that each term embraces all equivalent elements operating in the same manner and used for solving the same problems.

Although the present invention is described in accordance with the preferred embodiments thereof, it is to be understood that changes and variations may be made without departing from the spirit and scope of the invention as will be easily understood, by those skilled in the art.

What is claimed is:

1. A device for seismic prospecting of the type in which elastic waves are generated by means of an explosion in water of an explosive gaseous mixture, comprising a first chamber adapted to be sunk to a depth for exploding a gaseous mixture supplied thereto for producing a primary pressure pulse, said first chamber having an outlet for the release of hot explosion gases generating a secondary pressure pulse upon the pulsation of a gas bubble formed by the explosion gases, and a second chamber coaxial with and communicating with said first chamber for exploding the gaseous mixture supplied thereto for providing a supply into the gas bubble of a fluid changing the magnitude of the secondary pressure pulse for the relative weakening of one of the pulses which is an interfering wave.

2. The device as claimed in claim 1 in which the second chamber is provided with a perforated bottom part having sprayers for spraying fluid which is water into an expanding gas bubble for intensifying the secondary pressure pulse up to a value exceedingly substantially the magnitude of the primary pressure pulse which is an interfering wave.

3. The device as claimed in claim 1 in which the second chamber is provided with an outlet adapted to direct the explosion gases into the same area and substantially in the same direction in which said gases are released from said first chamber, and said second chamber being disposed behind said first chamber coaxially in the direction of the release of the explosion gases so as to retard the release of gases resulting from the explosion in the second chamber into said area.

References Cited

UNITED STATES PATENTS

| | | | |
|---|---|---|---|
| 2,619,186 | 11/1952 | Carlisle | 181—.5 |
| 2,877,859 | 3/1959 | Knudson | 181—.5 |
| 3,292,140 | 12/1966 | Angona et al. | 181—.5 |

BENJAMIN A. BORCHELT, *Primary Examiner.*

GERALD H. GLANZMAN, *Assistant Examiner.*